Patented June 26, 1934

1,963,967

UNITED STATES PATENT OFFICE 1,963,967

VAT DYESTUFF PREPARATIONS

Hermann Berthold, Leverkusen-on-the-Rhine, Germany, assignor to General Aniline Works, Inc., New York, N. Y., a corporation of Delaware No Drawing. Application November 18, 1930, Serial No. 496,558. In Germany November 19, 1929

23 Claims. (Cl. 8—5)

The present invention relates to new vat dyestuff preparations suitable for printing purposes, to a process of printing textile fibers with these preparations and to the printed fabrics obtainable by the application of said dyestuff preparations.

In accordance with the invention hydroxy anthraquinones or substitution products thereof, or also reduction products of these substances, which still contain oxygen in the ms-position or mixtures of compounds of these types are employed to influence favorably the capacity for printing of vat dyestuffs, that is, to improve the strength of the printings obtainable and at the same time the speed of fixation.

The further addition of anthraquinone or reduction products thereof containing oxygen enhances the efficacy of the first mentioned products in many cases.

The hydroxy anthraquinone, and also the anthraquinone or the reduction products of these substances are preferably applied in a finely divided state for the purposes of the present process. This may be accomplished in a variety of ways. Thus, for example, the substances in question may be finely ground or they may be dissolved in sulfuric acid and reprecipitated with water or, in so far as they are soluble in alkali, they may be dissolved in caustic alkalies, for example, in caustic soda solution and reprecipitated with mineral acids. Finally, they may be reduced, wholly or in part, if desired in the presence of glycerine or other similar polyvalent alcohols soluble in water, and thus be obtained in a condition which does not lead to deposition. This method of working shows technical advantages in so far as expenses are obviated in respect of milling, drying or dissolving in sulfuric acid and precipitation therefrom, as well as washing until neutral, and furthermore in so far as this process can be combined with that of the manufacture of the dyestuff preparations to one step of working.

The incorporating of the hydroxy anthraquinones or their reduction products containing oxygen in the ms-position within the dyestuffs may be accomplished in a variety of ways. For example, the different constituents may be mixed in the dry state or in form of aqueous pastes; or, the hydroxy anthraquinone etc. may be added to the printing colors at any stage of their manufacture. The best results generally are obtained when adding the hydroxy anthraquinones to aqueous pastes of the dyestuffs containing glycerine or another similar polyvalent water soluble alcohol, such as glycol, thiodiglycol, thiodiglycerol and the like. The pastes thus obtainable are very stable, do not deposit or dry up, do not form crusts and can be applied for printing purposes even after prolonged storing. In some cases it will be of advantage to work in the following manner: The dyestuff is suspended in water, glycerine or another water soluble alcohol as mentioned above is added and the dyestuff reduced in this suspension by means of a reducing agent customariy employed in vat dyeing and in the presence of an alkali such as caustic soda solution, caustic potash solution or preferably a weaker alkali such as ammonia, sodium carbonate, potassium carbonate or the like. As reducing agents alkali metal hydrosulfites, titanium trichloride etc. will be suitable ones. A hydroxy anthraquinone or a reduction product thereof containing oxygen in the ms-position is added to the preparations above mentioned at any desired stage of their manufacture. The dyestuff pastes thus obtainable containing the dyestuff in a reduced form (in the case of applying a rather weak alkali such as ammonia, soda or potash probably in the form of the free leuco acid) likewise do not deposit, do not congeal, do not form crusts, and for printing purposes possess similar advantages as the preparations mentioned before.

Besides the hydroxy anthraquinones and/or their reduction products above specified, anthraquinone or its reduction product containing oxygen and/or so-called hydrotropically acting agents may be added. Under the term "hydrotropically acting agents" I understand compounds promoting the solubility of water insoluble or difficulty soluble substances in water (compare Neuberg, Biochemische Zeitschrift vol. 76, (1916) page 107 ff.; Tamba, Biochemische Zeitschrift, vol. 145, (1924) page 415 ff.; Neuberg, Sitzungsberichte der köngl. preuss. Akademie der Wiss. 1916). Suitable hydrotropically acting agents are for example: Urea, substituted ureas, thiourea, hexamethylenetetramine, the potassium salt of ethylether sulfonic acid or -methylether sulfonic acid, the alkali metal salts (including ammonium salts) of the following acids: isobutyric acid, phenylacetic acid, benzoic acid, ortho-toluene carboxylic acid, salicyclic acid, the benzene sulfinic acids, 1.4-toluene sulfinic acid, the benzene sulfonic acids, para-toluene sulfonic acid, naphthalene sulfonic acids, for example, naphthalene-1- or 2-sulfonic acid, aniline sulfonic acids and substitution products thereof, such as for example, dimethylmetanilic- or diethylmetanilic acid, dimethyl-2-toluidine-4-sulfonic acid, dimethyl-4-aminobenzoic acid, alkali metal salts of hydroaromatic carboxylic and sulfonic acids, as for example the cyclohexane carboxylic acid, tetrahydronaphthalene-β-sulfonic acid and the like.

It may be mentioned that the hydrotropically acting agent to be used in a particular case will depend on the nature of the dyestuff to be printed as well as on the printing method applied.

Instead of the pure hydroxy anthraquinones mixtures of the same can be applied, for example the technical mixture of 2.6- and 2.7-dihydroxyanthraquinone, or substituted hydroxy anthraquinones such as halogenated hydroxy anthraquinones, aminohydroxyanthraquinones etc.

For printing purposes the preparations described above are worked up to printing colors in any desired manner. For example, the dry preparations may be made up to aqueous pastes suitably in the presence of glycerine, ethylene glycol or another similar polyvalent water soluble alcohol, a thickening of any desired composition is added, furthermore caustic soda solution and sodium hydrosulfite, and the mixture heated to 60° C., until the dyestuff has dissolved in the form of its leuco derivative. After cooling, sodium formaldehydesulfoxylate and potassium carbonate are stirred into the mixture. Cotton or another suitable textile product is printed with this printing color, the printings are steamed, for example, in a Mather-Platt apparatus and developed by a treatment with suitable oxidizing agents such as oxygen (air), potassium bichromate and acetic acid and the like. Finally the printings are soaped while boiling.

Another method of printing with my preparations will be as follows:

The powdery preparations are made up to an aqueous paste, a thickening, glycerine, potassium carbonate and sodium formaldehydeoxylate are added and textile products are printed with these printing colors containing the dyestuff in the unreduced state. The printings are steamed, whereby reduction of the dyestuff occurs, and further treated as described above. Instead of the powdery preparations the aqueous pastes thereof, which may contain glycerine, ethylene glycol, thiodiglycol etc. may be applied, whereby in case that the pastes contain glycerine etc. a further addition of the latter when preparing the printing colors will be unnecessary in many cases but necessary in other cases, mainly depending on the type of dyestuff applied. According to this process also my dyestuff preparations, obtained by reducing the dyestuffs in the presence of water, glycerine and an alkali, preferably one which is weaker than caustic alkali solutions, such as ammonia, sodium carbonate, potassium carbonate etc., may be worked up to printing colors and applied for printing purposes. It may be mentioned that also in this case the addition of a suitable reducing agent, such as sodium formaldehyde sulfoxylate and of an alkali and in most cases of glycerine, thiodiglycol or the like, to the printing color will be necessary or at least advantageous in order to obtain the best results.

The following examples illustrate the invention without limiting it thereto:

*Example 1.*—400 grams of 2-hydroxyanthraquinone are made into a paste with 800 grams of glycerine and 3000 grams of water and reduced at 70° C. by means of 800 grams of aqueous ammonia (25%) and 160 grams of sodium hydrosulfite, whereby a mixture of finely divided 2-hydroxyanthraquinone and reduction products of the same is formed. The mixture is evaporated on the water bath until it contains about 25% of 2-hydroxyanthraquinone or reduction products thereof.

*Example 2.*—From 20 parts by weight of 6,6'-dichloro-4,4'-dimethyl-bis-thionaphthene indigo, 4 parts by weight of glycerine, 6 parts by weight of 2-hydroxyanthraquinone (25% paste) and 70 parts by weight of a thickening of the following composition.

|  | Grams |
|---|---|
| Wheat starch | 60 |
| Water | 150 |
| British gum powder | 60 |
| Commercial gum 1:1 | 260 |
| Tragacanth 65:1000 | 170 |
| Potash | 150 |
| Sodium formaldehydesulfoxylate | 150 |
|  | 1000 | a printing color is produced by heating for a short time at 50–60° C. and employed for printing in the customary manner. The printed fabric is dried and steamed moist for 5 minutes. The dyestuff is developed by means of potassium dichromate-acetic acid mixture (2 grams of potassium dichromate, 5 ccs. of 30% acetic acid in 1 litre of water) and soaped at the boil with Marseilles soap.

Instead of 2-hydroxyanthraquinone paste reduction products or mixtures of the same with 2-hydroxyanthraquinone, obtainable according to Example 1 or 1-hydroxyanthraquinone and reduction products thereof, can also be employed.

Instead of the above dyestuff 6.6'-diethoxy-2.2'-bis-thionaphthene indigo can be employed or also the brown dyestuff obtainable from naphthoxy-thionaphthene-carboxylic acid

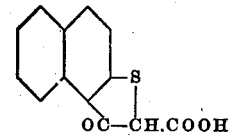

by oxidation with potassium ferricyanide in solution rendered alkaline with caustic soda, or the red violet dyestuff, obtainable from 2-methyl-4-chlorophenylthioglycollic acid by heating with strong sulfuric acid on the water bath.

In all cases a deeper shade is attained coupled with improved fixing compared with that obtainable without the addition of the said anthraquinone derivatives.

*Example 3.*—By replacing the dyestuffs indicated in Example 2 by the 2.7-dibromo anthanthrone obtainable by bromination of anthanthrone, or by the dyestuff given in the Colour index No. 1135, page 271 (4.8-dianisoyl-diamino-1.5-dihydroxyanthraquinone) or by the dyestuff given in the Colour index No. 1134, page 271 (4-benzoylamino-8-anisoylamino-1.5 - dihydroxyanthraquinone) or by dimethoxydibenzanthrone (Caledon-jade green, Colour index No. 1101, page 265) or by 5.5'-dibenzoylamino-dianthraquinonyl-1.1'-oxamide, or by dichloroisoviolanthrone (Colour index, I. edition, No. 1104) and by employing finely divided anthraflavic acid instead of the 2-hydroxyanthraquinone mentioned in Example 2, deeper and better fixing printings are likewise obtained than without the addition of anthraflavic acid.

*Example 4.*—The following combinations, after working up to printing pastes in accordance with Example 2, yield similar favorable results:—

1. The dyestuff from 6-methoxy-3-hydroxythionaphthene and 4-methyl - 6 - bromo-2.3-dihydro-3-ketothionaphthene-2-(para-dimethylamino)-anile (Example 6 of German Patent No. 419,867) with the addition of 2-hydroxy-1-chloroanthraquinone or 1-hydroxy-4-chloroanthraquinone or 1.5-dihydroxyanthraquinone.

2. The dibenzopyrene-quinone obtainable, for example, by reacting upon Bz-1-benzoyl-benzanthrone with aluminium chloride at 180° C. with the addition of 2-hydroxy-1-chloroanthraquinone.

3. The dyestuff given in the Colour index No. 1118 (flavanthrone) page 268, or the dyestuff which is obtained from 2-methyl-4-chlorophenyl-thioglycollic acid by heating with strong sulfuric acid on the water bath, or dimethoxy-dibenzanthrone, (Colour index No. 1101, page 265) with the addition of 1.8-dihydroxyanthraquinone.

*Example 5A.*—1869.2 grams of a 10% aqueous paste of 6.6'-diethoxy-2.2'-bis-thionaphthene indigo, 33.1 grams of anthraquinone (30.2% paste), 81.8 grams of 2-hydroxyanthraquinone (12.23% paste), 400 grams of glycerine (88%) are reduced at 70° C. with 400 grams of ammonia (about 25%) and 80 grams of sodium hydrosulfite, after the reduction incorporated with 100 grams of sodium benzenesulfonate and concentrated until the paste is 11.8% (calculated on the content of the dyestuff).

*Example 5B.*—From 20 parts by weight of the dyestuff preparation obtainable according to the directions of Example 5A, and 80 parts by weight of a thickening, containing:

| | Grams |
|---|---|
| Tragacanth 65:1000 | 170 |
| Commercial gum 1.1 | 160 |
| Wheat starch | 60 |
| Water | 150 |
| British gum powder | 60 |
| Glycerine | 100 |
| Potash | 150 |
| Sodium formaldehydesulfoxylate | 150 | per 1000 parts, a printing color is produced without heating and allowed to stand overnight. Printings obtained with this printing paste according to the directions of Example 2 show a considerably increased fixation in contradistinction to a printing, produced with the usual commercial, aqueous dyestuff paste without the addition of anthraquinone derivatives and hydrotropic agents.

*Example 6.*—368.7 grams of a 10.85% paste of the dyestuff 4.8-dianisoyldiamino-1.5-dihydroxyanthraquinone (Col. Ind. No. 1133, p. 271), 68.3 grams of anthraflavic acid, finely ground and 80 grams of glycerine (88%), and, if desired, 40 grams of urea are concentrated with stirring until the dyestuff content amounts to 10.85%. The dyestuff preparation is then passed through a fine sieve and forms a non-depositing paste of desirable ointment-like consistency, which does not congeal and form incrustations. A printing produced in an analogous manner to Example 5B shows increased intensity and a considerable improvement in regard to fixation in contradistinction to a printing from ordinary dyestuff paste.

Similar results are obtained when using in this example instead of 4.8-dianisoyldiamino-1.5-dihydroxyanthraquinone aqueous pastes of the other dyestuffs mentioned in Example 3.

*Example 7.*—By replacing the dyestuff of Example 6 by the dyestuff of Example 1 of the U. S. Patent No. 1,667,848, and evaporating until the dyestuff content amounts to 18%, considerably fuller printings (about 40% increase of intensity) and better fixing are likewise obtained than with printings by means of the ordinary dyestuff printing pastes without addition of anthraflavic acid.

*Example 8.*—100 grams of a 10% aqueous paste of 4.5'-dibenzoyldiamino-1.1'-dianthraquinylamine-carbazol, 20 grams of crude glycerine and 10 grams of a 10% aqueous preparation obtained from anthraflavic acid in accordance with Example 1, or 1 gram of finely ground anthraflavic acid, are evaporated until the preparation has a dyestuff content of 11.8%. The paste thus obtained is passed through a fine meshed sieve. On using the resulting paste for printing purposes, after the addition of the usual ingredients, better fixed and stronger printings, for example, on cotton, wool or acetate silk are obtained, than without the addition of the anthraflavic acid preparation.

10 grams of urea or another hydrotropically acting agent, such as sodium dimethylmetanilate, sodium dimethylsulfanilate, sodium naphthalene-β-sulfonate or mixtures of such substances may be added besides the anthraflavic acid preparation with good effect.

Instead of applying the 10% aqueous paste of the dyestuff higher concentrated pastes or water containing press cakes of the same may be applied, in which case evaporation will be unnecessary. The dyestuffs of Example 3 may be applied in this example with a similar result.

*Example 9.*—A mixture of 2417 grams of an aqueous 16.6% paste of dibromopyranthrone, 800 grams of crude glycerine (88%) and 40 grams of the disodium salt of anthraflavic acid is evaporated to a dyestuff content of 12%. This paste, when applied for printing purposes, exhibits similar effects to those described in Example 8.

400 parts of urea or another hydrotropically acting agent such as sodium benzene sulfonate, sodium dimethyl-sulfanilate, sodium naphthalene-α- or β-sulfonate or sodium-tetrahydronaphthalene-β-sulfonate may be added besides the sodium salt of anthraflavic acid whereby the utility of the paste for printing purposes is still increased.

*Example 10.*—400 grams of a 10% aqueous paste of 6.6'-diethoxy-2.2'-bis-thionaphtheneindigo, 2 grams of anthraflavic acid (finely ground or in the form of an aqueous paste), 80 grams of glycerine are reduced with 100 grams of aqueous ammonia 25% and 20 grams of sodium hydrosulfite at 70° C. 30 grams of sodium benzene sulfonate are added and the mixture evaporated to a dyestuff content of 12%. The paste thus obtained can be applied for printing purposes in accordance with Example 5B.

By applying in this example 6.6'-dichloro-4.4'-dimethyl-bis-thionaphtheneindigo and phthalic acid or phthalic anhydride as hydrotropically acting agent a dyestuff preparation valuable for printing purposes is likewise obtained.

The preparations of this example furthermore possess valuable properties in slop padding processes.

*Example 11.*—50 grams of the dyestuff of the probable formula:

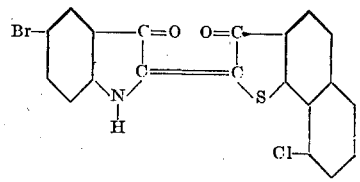

together with 300 grams of water, 100 grams of glycerine 88%, 88 grams of ammonia (25%) are reduced at 70° C. with 20 grams of sodium hydrosulfite and evaporated with the addition of 5 grams of anthraflavic acid (finely ground) and 12.5 grams of sodium dimethyl-sulfanilate to 250 grams, that is to say, to a paste of 20% dyestuff content. The preparation gives a more complete black with better fixing than the dyestuff only suspended in water.

Instead of glycerine other suitable organic alcohols soluble in water, such as ethylene-glycol may be used.

When applying the dyestuff above mentioned together with rather small amounts (e. g. about 5–10%) of a yellow to orange vat dyestuff, especially beautiful black shades are obtainable.

The anthraflavic acid may also be added before the reduction.

If desired 20 grams of sodium benzene sulfonate may be added and the mixture evaporated to a dyestuff content of 20%. The paste thus obtained is stable and may be applied for printing purposes, after working up to a printing color in the usual manner, with the effect of yielding on cotton very powerful well-fixed and even grey to black shades.

I claim:

1. A dyestuff printing preparation comprising 4.8-dianisoyldiamino-1.5-dihydroxy anthraquinone and finely divided anthraflavic acid.

2. A dyestuff printing preparation comprising 4.8-dianisoyldiamino-1.5-dihydroxy anthraquinone, glycerine and finely divided anthraflavic acid.

3. A dyestuff printing preparation comprising 4.5'-dibenzoyl-diamino - 1.1' - dianthraquinonyl-amine carbazol and anthraflavic acid.

4. A dyestuff printing preparation comprising 4.5'-dibenzoyl-diamino - 1.1' - dianthraquinonyl-amine carbazol, anthraflavic acid and glycerine.

5. A dyestuff printing preparation comprising the dyestuff of the probable formula:

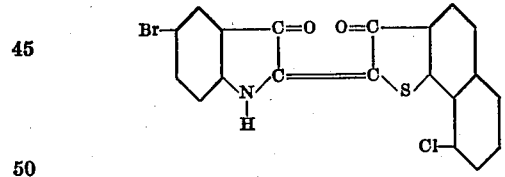

and anthraflavic acid.

6. A dyestuff printing preparation comprising the dyestuff of the probable formula:

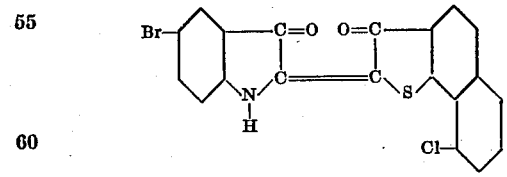

anthraflavic acid and glycerine.

7. A dyestuff printing preparation comprising the dyestuff of the probable formula:

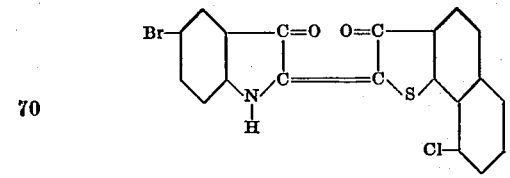

anthraflavic acid, glycerine and a hydrotropic agent.

8. A vat dyestuff printing preparation comprising a hydrotropically acting agent and a compound of the group consisting of hydroxy anthraquinones, which may be substituted in the nucleus by halogen atoms or amino groups, and such reduction products of these compounds, as still contain oxygen in the meso-position.

9. A vat dyestuff printing paste comprising a compound of the group consisting of glycerine and similar water soluble polyvalent alcohols, and a compound of the group consisting of hydroxy anthraquinones, which may be substituted in the nucleus by halogen atoms or amino groups, and such reduction products of these compounds, as still contain oxygen in the meso-position.

10. A dyestuff printing paste comprising an unreduced vat dyestuff, glycerine and a compound of the group consisting of hydroxy anthraquinones, which may be substituted in the nucleus by halogen atoms or amino groups, and such reduction products of these compounds, as still contain oxygen in the meso-position.

11. A dyestuff printing paste comprising an unreduced vat dyestuff, glycerine and a compound of the formula

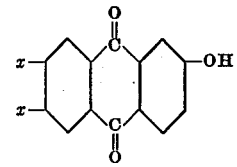

wherein the $x$'s mean hydrogen or one $x$ stands for hydrogen and the other $x$ for the hydroxy group.

12. A dyestuff printing paste comprising an unreduced vat dyestuff, glycerine and anthraflavic acid.

13. A dyestuff printing paste comprising a reduced vat dyestuff, glycerine and a compound of the formula

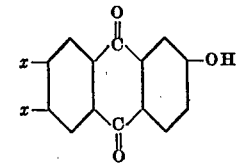

wherein the $x$'s mean hydrogen or one $x$ stands for hydrogen and the other $x$ for the hydroxy group.

14. A dyestuff printing paste comprising a reduced vat dyestuff, glycerine and anthraflavic acid.

15. A vat dyestuff printing paste comprising a compound of the group consisting of glycerine and similar water soluble polyvalent alcohols, a hydrotropically acting agent and a compound of the group consisting of hydroxy anthraquinones, which may be substituted in the nucleus by halogen atoms or amino groups and such reduction products of these compounds, as still contain oxygen in the meso-position.

16. A dyestuff printing paste comprising an unreduced vat dyestuff, glycerine, a hydrotropically acting agent and a compound of the group consisting of hydroxy antraquinones, which may be substituted in the nucleus by halogen atoms or amino-groups, and such reduction products of these compounds, as still contain oxygen in the meso-position.

17. A dyestuff printing paste comprising an unreduced vat dyestuff, glycerine, a hydrotropically acting agent and a compound of the formula

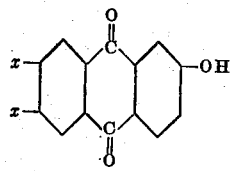

wherein the $x$'s mean hydrogen or one $x$ stands for hydrogen and the other $x$ for the hydroxy group.

18. A dyestuff printing paste comprising an unreduced vat dyestuff, glycerine, a hydrotropically acting agent and anthraflavic acid.

19. A dyestuff printing paste comprising a reduced vat dyestuff, glycerine, a hydrotropically acting agent and a compound of the formula

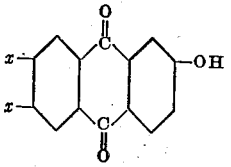

wherein the $x$'s mean hydrogen or one $x$ stands for hydrogen and the other $x$ for the hydroxy group.

20. A dyestuff printing paste comprising a reduced vat dyestuff, glycerine, a hydrotropically acting agent and anthraflavic acid.

21. The process which comprises printing textile fibers with a printing paste derived from a vat dyestuff, said paste comprising a compound of the group consisting of hydroxy anthraquinones, which may be substituted in the nucleus by halogen atoms or amino groups and such reduction products of these compounds as still contain oxygen in the meso-position.

22. The process which comprises printing cotton with a printing paste derived from a vat dyestuff, said paste comprising a compound of the formula

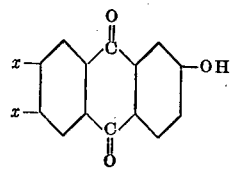

wherein the $x$'s stand for hydrogen or one $x$ stands for hydrogen and the other $x$ for the hydroxy group.

23. The process which comprises printing cotton with a printing paste derived from a vat dyestuff, said paste containing anthraflavic acid.

HERMAN BERTHOLD.